March 19, 1929.   C. J. ALLEN ET AL   1,706,204
CULTIVATOR GANG COUPLING
Filed Jan. 25, 1928
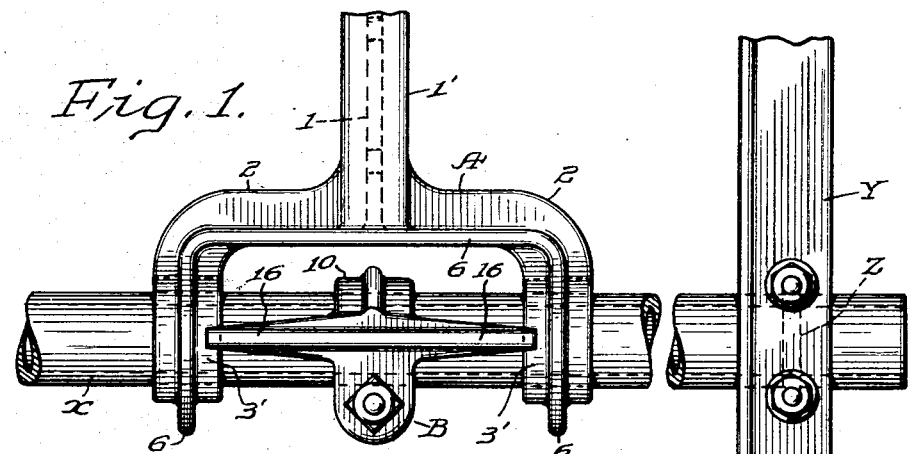
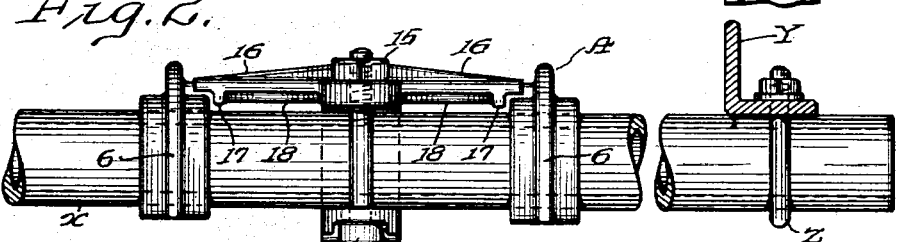
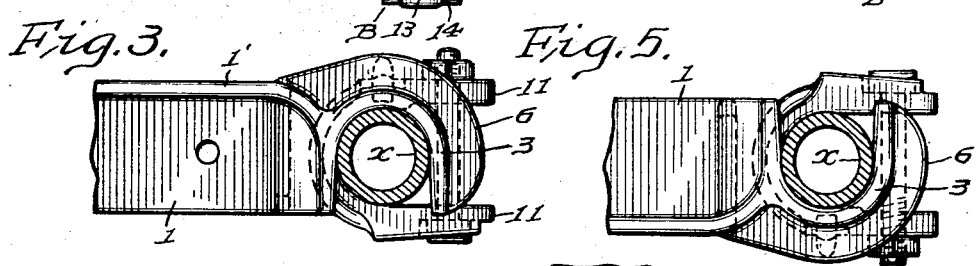
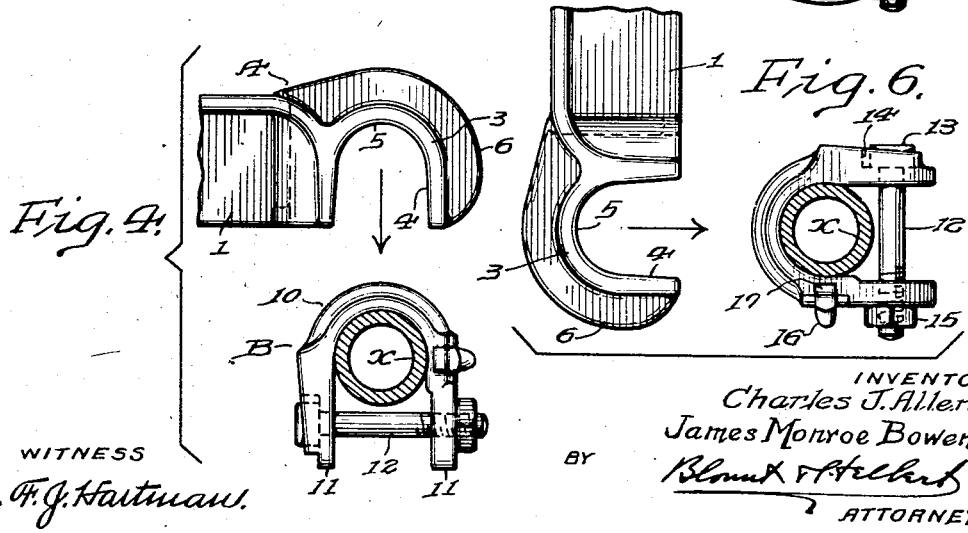
INVENTORS
Charles J. Allen,
James Monroe Bowen.
BY
ATTORNEYS
WITNESS Patented Mar. 19, 1929.

1,706,204

UNITED STATES PATENT OFFICE.

CHARLES J. ALLEN, OF MOORESTOWN, AND JAMES MONROE BOWEN, OF CAPE MAY C. H., NEW JERSEY, ASSIGNORS TO S. L. ALLEN & CO., INC., A CORPORATION OF PENNSYLVANIA.

CULTIVATOR GANG COUPLING.

Application filed January 25, 1928. Serial No. 249,360.

A principal object of the present invention is to provide improved means for coupling the gangs to the draft bar or other similar part of cultivating machines, or the like, said means being of such character as to permit the gangs to be readily attached to or removed from the draft bar as well as to permit the limited rotation or oscillation of the gangs about the bar which is requisite in the operation of the cultivator.

Further objects of the invention are to provide a cultivator gang coupling which may be readily adjusted longitudinally of the draft bar to enable the gang to be positioned at any desired point thereon and which consists of but two cooperative parts, one of which is permanently attached to the gang and the other of which may be relatively permanently disposed on the draft bar so that when the gang is detached therefrom there are no loose parts which must be cared for to prevent their becoming lost or mislaid.

Still further objects of the invention are to generally improve the design and construction of the cultivator gang couplings as well as to provide a coupling which is not liable to become damaged or get out of order under the conditions of operation to which devices of this character are necessarily subjected, which is of simple form and which requires a minimum amount of machining in its production and may therefore be manufactured and marketed at a relatively low price.

To enable those skilled in the art to comprehend and practise our invention, we have illustrated in the accompanying drawing and will now proceed to describe a preferred embodiment of the same, it being understood however that we do not thereby desire or intend to specifically confine ourselves to the precise form of the invention which we have chosen to refer as, if desired, various changes and modifications may be made in the design, construction and arrangement of the various parts and the device may be used for purposes other than coupling the gangs of cultivating implements to a draft bar without departing from the spirit and scope of the invention as hereinafter claimed.

In the drawing Fig. 1 is a top plan view of the coupling in operative position on the draft bar of a cultivator or the like, a portion of the frame of the cultivator as well as the connecting means by which the draft bar is secured thereto being also shown, and Fig. 2 is a front elevation of the parts shown in Fig. 1. Fig. 3 is an end elevation of the coupling shown in the preceding figures but with the draft bar shown in section, and Fig. 4 is a composite view intended to illustrate one method of assembling the two parts of the coupling in operative position on the draft bar. In Fig. 5, which generally corresponds to Fig. 3, we have shown another manner of employing the coupling which, under some conditions, may be found desirable, while Fig. 6 is a composite figure generally corresponding to Fig. 4 and intended to illustrate the method of assembling the coupling when used in the manner to which reference has just been made. The same symbols are used to designate the same parts in the several figures.

The coupling comprises two cooperative members, generally designated as A and B, which when associated as hereinafter described form the complete operative unit. The member, which for convenience may be termed the movable member, A is adapted for connection to the gang bar or other part which is to be coupled to the draft bar X or other part of the cultivator or like machine while the member B is adapted for relatively permanent disposition on the draft bar. This bar is ordinarily arranged to extend transversely of the machine and is secured near its ends to the frame Y or other portion thereof in any suitable way as by means of a U-shaped clip Z as will be readily understood. Normally when in operative position the cultivator gang or gangs extend rearwardly from this bar and serve to support the cultivating tools or other ground working implements.

The member A of the coupling is in the form of a yoke having a central tang desirably comprising a web 1 having a transversely disposed flange 1' along one edge and a pair of arms 2, 2 which respectively extend laterally outward in opposite directions from the tang and then turn into parallelism with the tang and with each other to form jaws 3, 3 each of which is provided with a slot 4 for the reception of the draft bar. As the latter is usually cylindrical, the bottoms of the slots are rounded or curved as at 5 so as to correspond with the curvature of the surface of the bar and from this curved portion the walls of the slot are carried out to the mouths or open ends of the slots either straight, or preferably and as shown, with a slight divergence from each other so as to facilitate the positioning of the member over the bar. To enhance the strength of the member a ridge-like flange or rib 6 may be provided on the outer surface 3' of each jaw and across the laterally extended portions of the arm so as to generally follow the conformation of the yoke. Desirably the member A is formed as an integral casting, drop forging or the like and, if accurately made, requires little or no machining; it can thus be manufactured at a relatively low cost.

It will be apparent that the member A is thus adapted to receive the draft bar within the openings in its jaws and can be attached to the bar by merely hooking it over the latter after bringing it into proper alignment therewith and further, that when so disposed, the member is capable of rotation or oscillation about the bar in either direction but could of course readily become detached from the same in the absence of the other member B of the coupling which will now be described.

This member which, as heretofore stated, is intended to remain relatively permanently on the draft bar, comprises a central generally U-shaped body 10 adapted to receive the bar, the bottom part of the slot formed between the free ends of this body being curved in correspondence with the bar as in the case of the jaws of the other member A. The free ends in effect thus form lugs 11 which are drilled for the passage of a clamping bolt 12 desirably provided with a squared head 13 adapted to seat in a correspondingly squared recess 14 formed in the outer surface of one of the lugs so as to prevent the bolt from turning. The other end of the bolt is arranged to project through the opposite lug 11 and provided with a clamping nut 15 which can be drawn up against the outer face of the lug to thereby rigidly clamp the member in any desired position upon the draft bar.

The member B, which for convenience may be termed the stationary member, is also provided with a pair of arms 16 preferably integral with the body 10 and respectively projecting outwardly therefrom in opposite directions substantially parallel to the axis of the draft bar when the member is positioned thereon. The length of these arms is such that when the two members of the coupling are assembled in cooperative relation as shown more especially in Figs. 1 and 2, the ends of the arms will overlie the outer surface 3' of the jaws 3 so as to prevent the member A from being removed from the draft bar except when it is turned to a predetermined position, as hereinafter described. To prevent the member A from moving longitudinally on the bar with respect to the member B each arm of the latter near its outer end is provided with a depending lug 17 so disposed that when the parts are assembled it will substantially abut the inner face of the adjacent jaw 3. If desired a strengthening rib 18 may be arranged to extend between each lug 17 and the central portion of the member.

As in the case of the member A, the member B except for the clamping bolt and nut is desirably made as a single casting or drop forging and thus requires substantially no machining other than that necessary to drill the holes for the passage of the clamping bolt. Therefore, as those surfaces of the members which under operative conditions are at times brought into engagement with each other are necessarily not as smooth and accurately finished as they would be if they were machined or otherwise carefully finished, it is desirable that the ends of the arms 16 and the lugs 17 be so disposed as to leave a slight clearance between them and the adjacent surfaces of the jaws 3 as best shown in Fig. 2 so as to insure free movement of the member A about the draft bar and prevent any binding between the relatively rough surfaces of the parts. The provision of this clearance necessarily results in a little play or lost motion between the two members both axially of the bar and also radially with respect thereto but in the class of implements in connection with which the coupling is primarily intended to be used this play or lost motion is immaterial; however, if for any reason it be deemed undesirable, it may be readily eliminated by accurately finishing the cooperative surfaces of the jaws and member B so that the ends of the arms 16 and lugs 17 will form a snug yet slidable fit on the surfaces of the jaws.

A coupling constructed in accordance with our invention may be assembled on the draft bar in two different ways, that is, either with the open ends of the jaws of the member B projecting downwardly, as shown in Figs. 1 to 3 inclusive and which is the most usual method, or with the open ends of the jaws projecting upwardly as shown in Fig. 5. Ordinarily as the member A is attached to a relatively heavy gang bar it is inconvenient to rotate the member about the draft bar for any considerable distance so that the following constitutes the most usual method of effecting the desired connection between the parts of the coupling when the latter is to be assembled as shown in Figs. 1 to 3. The clamping bolt of the member B being loosened, the member is first slipped over the end of the draft bar and the latter then secured to the frame of the machine in its proper position. The member is then slipped along the bar to the desired point and turned about the bar until the open end of the portion 10 points downward as shown in Fig. 4. When in this position the movable member A can readily be hooked over the bar by moving it in the direction indicated by the arrow in Fig. 4 as the ends of the arms 16 and lugs 17 on member B present no obstacle to the passage of the jaws 3 in their downward movement. The movable member being thus seated on the bar, the stationary member B is next turned upwardly in a counter-clockwise direction when viewed as in Fig. 4 through an angle of about 90° and then clamped into position by setting up on the nut 15. This brings the extremities of the arms 16 over the curved or central portions of the jaws and thereby prevents disengagement of the member B from the draft bar unless it is turned downward about the latter through a substantially corresponding angle, it being impossible to effect disengagement of the member by turning it in the opposite direction because the arms 16 are too long to pass through the closed side of the yoke-like portion of the member A, as will be apparent from an inspection of Fig. 1. The movable member A, with its attached gang is, however, entirely free to oscillate above or below the horizontal plane through a relatively considerable angle when assembled with the stationary member B as just described and as this angle is much greater than that through which the gang is ever required to move in operation, a secure and efficient coupling between the gang and the draft bar is thus effected. When it is desired to detach the gang from the draft bar the clamping nut on the stationary member may be loosened and the member then turned downward to the position shown in Fig. 4, thus permitting the movable member to be lifted off the bar, or, in the alternative, the clips Z which secure the bar to the frame may be loosened and the whole bar rotated without loosening the clamp until the member B is brought to substantially the position shown in Fig. 4 to thereby permit the movable member to be removed.

In Figs. 5 and 6 a somewhat different manner of employing the coupling is shown, the movable member A in this case being hooked over the bar with the open ends of the jaws 3 directed upward. Under such conditions it may sometimes be feasible to engage the movable member over the bar by turning it to a vertical position as shown in Fig. 6 without the necessity of either rotating the bar or rotating the member B thereon from the position which the latter occupies under normal conditions, but it will usually be found more convenient to turn the bar or to turn the member B on the bar to a position in which the movable member A can be hooked onto the bar by moving it vertically upward until it seats thereon and then to rotate the bar and clamp together or to rotate the clamp upon the bar, as the case may be, until the ends of the arms 16 are brought beneath the curved portions of the jaws 3.

It will be noted that when the clamp is assembled as shown in Figs. 1 to 3 the weight of the movable member is carried by the bar while when assembled as in Fig. 5 the weight of the said member is supported on the ends of the arms 16. Obviously the manner in which the movable member is disposed on the bar, that is, whether as shown in Fig. 3 or in Fig. 5, will be determined by the particular conditions of operation encountered, but ordinarily the former method is preferred as in it the bar supports the weight of the movable member and attached parts as just pointed out.

Having thus described our invention, we claim and desire to protect by Letters Patent of the United States:

1. A device of the class described comprising a pair of cooperative members, one having aligned slots adapted to receive a supporting bar and the other including a body adapted to receive the bar, means for securing the member last mentioned to the bar, and laterally extended arms projecting at opposite directions from the body operative to overlie portions of the first mentioned member and prevent its detachment from the bar save when said parts are in a predetermined position with respect to each other.

2. A device of the class described comprising a pair of cooperative members, one including a yoke adapted for attachment to a cultivator gang and having aligned slots disposed adjacent the ends of its arms adapted to receive a cylindrical supporting bar, and the other including a body adapted to receive the bar, means for adjustably securing the last mentioned member to the bar, and laterally extended arms projecting in opposite directions from the body operative to overlie the arms of the yoke and prevent its removal from the bar save when the members are turned relatively to each other to a predetermined position.

3. A device of the class described comprising a pair of cooperative members, one member including a yoke having a tang adapted for attachment to a cultivator gang and aligned slots respectively disposed adjacent the ends of its arms adapted to receive a cylindrical supporting bar, and the other member including a body adapted to receive the bar, means for drawing said body snugly about the bar to fixedly secure the second member thereon, laterally extended arm projecting in opposite directions from the body operative to overlie portions of the yoke, and means carried by each arm adapted to prevent longitudinal movement of the first member with respect to the second member when the members are assembled on the bar.

4. A device of the class described comprising a pair of cooperative members, one member including a yoke having a tang adapted for attachment to a cultivator gang and aligned slots respectively disposed adjacent the ends of its arms adapted to receive a cylindrical supporting bar, and the other member including a body adapted to receive the bar, means for drawing said body snugly about the bar to fixedly secure the second member thereon, laterally extended arms projecting in opposite directions from the body operative to overlie portions of the yoke, and a lug adjacent the end of each of said arms operative to engage the adjacent arm of the yoke to prevent relative longitudinal movement between the members when assembled on the bar.

5. A device of the class described comprising a pair of cooperative members, one member including a yoke adapted for attachment to a cultivator gang and having jaws adjacent the ends of its arms adapted to receive a cylindrical supporting bar and the other member including a U-shaped body adapted to receive the bar, means for drawing said body snugly about the bar to fixedly secure the second member thereon, laterally extended arms projecting in opposite directions from the body operative to overlie the jaws of the yoke when the said member is disposed therebetween and prevent the detachment of the first mentioned member from the supporting bar save when both members are in a predetermined position with respect to each other, and a lug adjacent the end of each of said arms operative to engage the adjacent arm of the yoke to prevent relative longitudinal movement between the members when assembled on the bar.

In witness whereof, we have hereunto set our hands this 23rd day of January, 1928.

CHARLES J. ALLEN.
JAMES MONROE BOWEN.